INVENTORS
THOMAS H. CABLE, JR.
GENE W. HINDS
WILLIAM J. KOEPPLIN

BY Leo A. Plum, Jr.
ATTORNEY

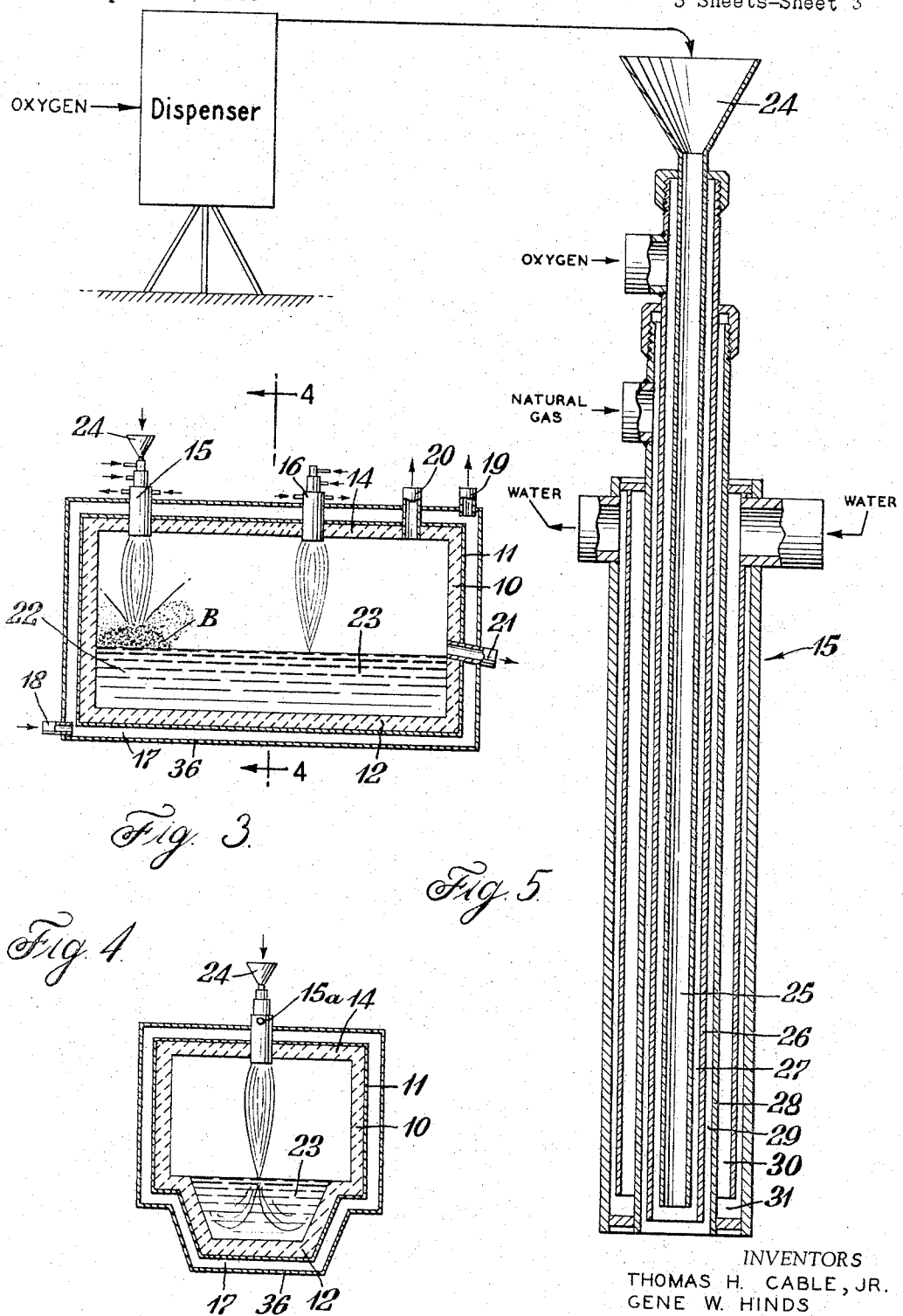

United States Patent Office 3,337,324
Patented Aug. 22, 1967

3,337,324
PROCESS FOR MELTING AND REFINING GLASS BATCH
Thomas H. Cable, Jr., Gibsonia, Pa., and Gene W. Hinds, Westfield, and William J. Koepplin, Summit, N.J., assignors to Union Carbide Corporation, a corporation of New York
Filed Apr. 30, 1963, Ser. No. 276,923
8 Claims. (Cl. 65—135)

This invention relates to the manufacture of glass and, more particularly, to a highly efficient process and apparatus for melting and refining raw batch glassmaking materials to produce a final glass product having high structural, color and clarity qualities.

In known conventional continuous glassmaking processes, the raw glassmaking materials are charged into one end of an elongated regenerative furnace and are removed at the opposite end in the form of a molten finished glass, being subjected successively in its passage through the furnace to fusion, refining and cooling toward a working temperature. The furnaces used generally consist of two zones; the first and longest being utilized for melting the raw batch materials, with the latter serving as the refining and cooling zone. As molten glass is withdrawn from the refining zone, the raw glass batch materials are added to the melting zone so that the process of melting and refining the glass is more or less continuous. The batch materials usually consist of a mixture of silica, as sand, an alkali such as potash or soda, and another base such as lime or lead oxide. The exact mixture used depends upon the specific glass product being produced as well as the color desired. A typical raw batch mixture for producing a clear lime-soda glass, for example, may consist of 200 parts sand, 50 parts limestone and 70 parts soda ash. Mixtures of this type are generally used in the production of container glass. When the batch materials are melted, the resulting molten mass is permeated with gas bubbles, sometimes referred to as seeds. This molten, but unrefined, glass is then advanced to the refining zone wher it is maintained within proper temperature and viscosity ranges to allow the dissolved gases to gradually rise to the surface and escape. This refining process requires many hours and is believed to be one of the major factors responsible for the low production rates and low efficiency of the conventional glassmaking process.

It has been assumed by many in the art that a long melting zone will give the molten glass ample opportunity to be, by natural convection currents, well mixed so as to promote homogeneity by the time the glass reaches the refining zone. In conformity with this well-known theory, it has been common practice to employ burners to melt the batch and raise the temperature of the bath by directing air-fuel flames over the surface of the bath. In some instances the burners have been positioned at the feed end of the furnace and fired longitudinally over the bath, while in other cases, the burners were positioned in the side walls of the furnace to fire across the bath. In each of the firing methods, it has been the object to supply sufficient fuel and air to the burners so as to establish a peak bath temperature near the longitudinal center of the furnace. See, for example, Patent No. 2,767,235. With such methods of operation, the batch is generally charged into the furnace feed end whereupon it floats upon the molten glass bath until melted. In practice, the batch doesn't become completely molten until passing the longitudinal center of the furnace. Since only a small portion of the air-fuel flames impinge directly upon the bath, transfer of heat to the bath occurs slowly. In addition, a major portion of the flame energy is radiated directly to the refractories. This in turn has required the use of relatively low flame temperatures in order to prevent rapid refractory wear. As will be explained in more detail hereinafter, such practices have necessitated the use of relatively large melting areas per ton of glass produced, and have resulted in relatively low overall fuel efficiency.

A further drawback associated with known continuous glassmaking processes resides in the use of regenerative furnaces which require a relatively high investment. These production furnaces are very large and consist essentially of a long melting zone with a smaller section for the refining zone, plus regenerative checker work alongside the furnace for preheating combustion air by heat exchange with the fuel gases. At the present time, such furnaces must be constructed to provide about 5 or more square feet of melting area per ton of glass produced. It can thus be appreciated that the initial cost, upkeep and further rebuild cost of a typical glassmaking furnace installation, on the order of 100 tons per day or more, for example, is of such magnitude as to represent a significant portion of the overall glass manufacturing expense.

Prior attempts to increase glass production or to utilize a smaller melting area per ton of glass produced have not been successful, as such methods produced glass which was of poor quality. The poor quality was attributed to the presence of unmelted batch particles in the product in addition to the presence therein of an undesirably large quantity of seeds. Such methods also resulted in increased refractory wear and decreased overall fuel efficiency.

It is therefore an object of our invention to overcome the above difficulties and provide a highly efficient process for manufacturing glass.

Another object is to provide a process and apparatus for rapidly producing a refined glass having high structural, color and clarity qualities.

Still another object is to provide a process and apparatus for producing high quality glass in furnaces having melting areas per ton which are substantially smaller than have been heretofore used.

A further object is to substantially increase the proportion of heat transferred to the raw material batch and decrease the proportion of heat transferred directly to the refractories so as to improve the overall fuel efficiency of the process and enable the use of higher flame temperatures without causing excessive refractory wear.

A still further object is to provide an improved glassmaking furnace which is inexpensive to build and maintain, when compared with present-day regenerative furnaces, occupies a comparatively small amount of space, and has provisions for operating continuously at elevated temperatures which are in excess of those heretofore employed in the commercial production of low cost glass such as, for example, common lime glass as used for containers.

The foregoing objects are achieved in the present invention which provides a process for the production of refined glass from raw glassmaking materials in a glassmaking furnace having a feed end zone and a discharge end zone, the process which, in its broadest aspects, comprises charging raw glassmaking materials into the feed end zone, directing at the raw glassmaking materials at least one heated effluent having a minimum temperature of 3500° F. and a sufficient heat content to completely melt and refine said raw materials and transfer thereto between 25,000 and 415,000 B.t.u./hour per square foot of furnace area; and withdrawing the refined glass from the discharge end zone while charging raw glassmaking materials into the feed end zone at rates sufficient to produce and maintain the glass being withdrawn from the discharge end zone at a temperature of at least 2600° F.

The process is based upon the discovery that the total heat required to melt and refine a given quantity of glass batch charged into a molten bath of glass will vary inversely as a function of the speed at which the melting occurs. We have found that at high ratios of heat input to the area in which the raw materials are melted, there is high overall fuel efficiency in the process. Effective heat input rate per square foot of melting area is the term we use to express the speed of melting, in a given size (tons per day) furnace. Expressed another way, the longer the batch is allowed to float upon the bath before it is completely melted, the higher the total heat requirements and the lower the overall fuel efficiency will be. While we do not wish to be limited in any way to a particular theory, we believe that when glass batch particles are melted slowly, a molten layer forms about the particles which acts like an insulator. This has the effect of lowering the rate at which heat will be absorbed by the batch. When a higher energy heat source is used to melt the batch faster, the effect has been to cause a peeling effect whereby layers of the batch are peeled away and immediately melted, and a new surface is continuously exposed to the heat source. Heat is therefore transferred to the batch at a much faster rate and less overall fuel is consumed per ton of glass produced.

The heated effluent may be produced by an oxidant-fuel burner using air, oxygen, or oxygen-enriched air as the oxidant. Alternatively, the heated effluent may be produced by an apparatus for creating an electric arc effluent, such as, for example, the device disclosed by Robert M. Gage in Patent No. 2,858,411. The heat producing device is preferably positioned in either the furnace wall or the furnace roof so that its heated product can be directed substantially vertically downward to impinge upon the batch in the feed end of the furnace.

For purposes of this specification, the term "substantially vertically downward," as used above, may be defined as a direction having an angle of zero to 45 degrees with respect to the vertical axis of the glassmaking furnace.

The underlying concept behind our invention is to rapidly melt all the batch charged while it is in the feed end of the furnace. The melting should be carried out by substantially direct contact with a hot flame or arc effluent having a temperature of at least 3500° F. and preferably higher. This melting process is to be contrasted with the well-known prior art concepts of solution melting whereby the batch floats upon the bath of molten glass until the heated solution eventually melts the batch. Solution melting is slow and inefficient and requires furnaces of as much as 9 times the size required in our process.

A glassmaking furnace especially suited for carrying out our process may comprise a refractory lined shell having a bottom, side walls and a roof, defining a chamber having a feed end and a discharge end; at least one burner positioned to fire substantially vertically downward into said feed end, said burner being capable of producing a flame having a temperature of at least 3500° F.

When operating with flame or arc effluent temperatures substantially in excess of 3500° F. i.e., on the order of 5000° F. or higher, in order to protect the furnace refractory from severe damage we prefer to employ a furnace as above described, with the addition of a second shell surrounding the refractory lined shell so as to define a coolant passage therebetween. Means are also provided for maintaining a continuous flow of coolant through this passage. Since the bath of molten glass in the furnace acts to protect the refractory bottom from the high temperature flame or arc effluent, it may be economical to provide coolant passages around the walls and roof only.

Other objects and features of novelty of the invention will be specifically pointed out or will become apparent when referring, for a better understanding of the invention, to the following description in conjunction with the accompanying drawings, wherein:

FIG. 3 is a side elevational sectional view of a glass-making furnace illustrating a preferred embodiment of the present invention;

FIG. 4 is a sectional view taken along the line 4—4 of FIG. 3; and

FIG. 5 is an enlarged sectional view of the batch feeding burner apparatus shown in FIG. 3.

Figure 1:
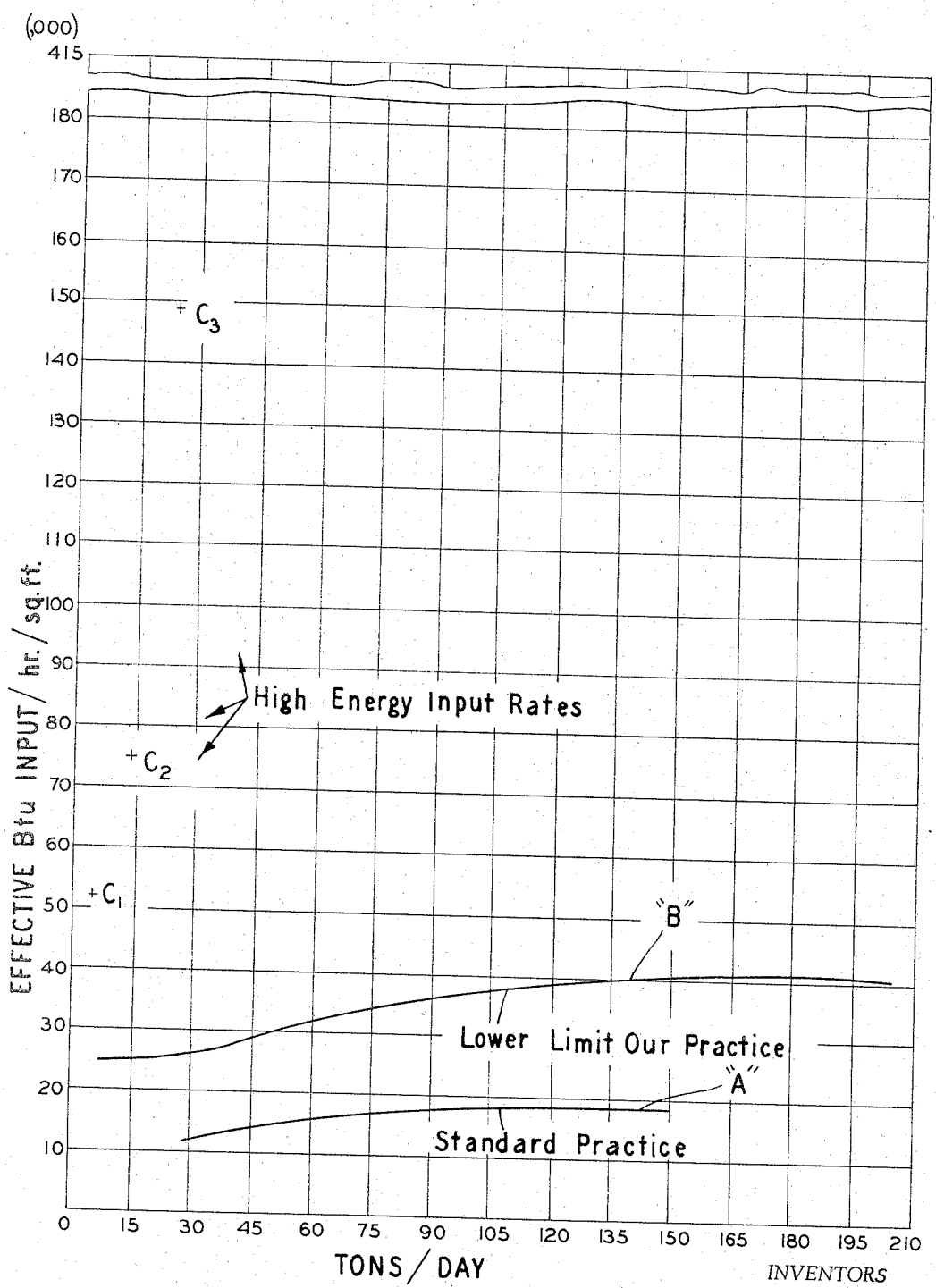
FIG. 1 is a diagram in the nature of a graph illustrating the effective heat input rates per square foot of melting area for various furnace outputs in tons per day, showing a comparison between standard practice and practice according to our invention.

Referring to FIG. 1, curve A illustrates the effective heat transferred per hour per square foot of melting area to the batch materials charged, for various furnace tonnage outputs between about 30 tons per day and 150 tons per day. As mentioned above, standard practice according to the prior art consists of charging the batch in heaps upon the molten glass and melting it predominantly by the heat of the molten bath. The batch is floated on the bath and mixed therewith by thermal currents, until it is completely melted. The bath is then held in a refining zone for a sufficient period to allow the escape of gas bubbles, before it is removed from the furnace. This practice of solution melting is considered to be slow, requires large furnace melting areas, and consumes large quantities of fuel. As shown by curve A, for output between 30 and 150 tons per day, standard practice transfers heat to the raw batch materials at a rate between about 12,000 and 18,000 B.t.u. per hour per square foot of melting area. For a furnace producing 100 tons per day, which is representative of the sizes used in the glass industry, heat would be transferred to the batch by solution melting at the rate of approximately 17,000 B.t.u./hour per square foot of melting area. (From curve A).

Since approximately 2,000,000 B.t.u. are required to melt a ton of batch, standard practice would require a furnace having a melting area of $$\frac{(2,000,000 \text{ B.t.u./ton})(100 \text{ tons/day})}{17,000 \text{ B.t.u./hr./sq. ft. of melting area} \times 24 \text{ hours/day}}$$

or approximately 490 square feet of melting area in order to produce a daily output of 100 tons.

Curve B, shown in FIG. 1, depicts the lower limit heat input rates per square foot of melting area to be used when practicing the process of our invention. As shown thereby, for production rates between 30 and 150 tons per day minimum heat input rates of between about 25,000 and 40,000 B.t.u./hr. per square foot of furnace melting area are required. The lower limit for a daily output of 100 tons would be about 36,000 B.t.u./hr. per square foot of melting area. The approximate furnace melting area required by our process would be $$\frac{(2,000,000)(100)}{(36,000)(24)}$$

or about 230 square feet. Thus, the lower limits of operation according to our process require less than one-half the furnace area required by standard practice operation. As will be referred to in more detail hereinafter, we were able to produce 25 tons per day of good quality glass by driving approximately 150,000 B.t.u./hr. per square foot of melting area into the charged batch materials. A furnace melting area of only 14 square feet was required. To produce this same tonnage when operating according to standard practice would require a furnace melting area on the order of 112 square feet or almost 9 times greater than required when operating in accordance with our invention. Moreover, at the 150,000 B.t.u./hr. per square foot heat input rate, a furnace fuel efficiency in excess of 40 percent was obtained. The results of development tests with our process have indicated that heat input rates per square foot of greater than 150,000 B.t.u./hr. may be economically justified. We have estimated the upper effective heat input rate with our process to be on the order of 415,000 B.t.u./hr. per square foot of furnace melting area. At this rate, we believe we can produce good quality glass in a furnace melting area of only 0.2 square feet per ton of glass. This would represent a furnace size requirement on the order of 1/20 that presently required in connection with standard glassmaking practice.

The term "melting area" as used throughout this specification refers to the standard definition used throughout the glass industry and represents the total bath area encompassing the melting and refining zones within a continuous type glass furnace. It does not include the working or holding zone usually found downstream of the bridge wall.

It has been assumed that a one ton charge of batch containing essentially no cullet will require approximately 2 million B.t.u. to melt it. Since it is often the practice in many glass shops to charge a batch containing on the order of 10 percent cullet, the 2 million B.t.u./ton figure, in addition to all the heat input rates referred to above, should be reduced by about 5 percent.

Figure 2:
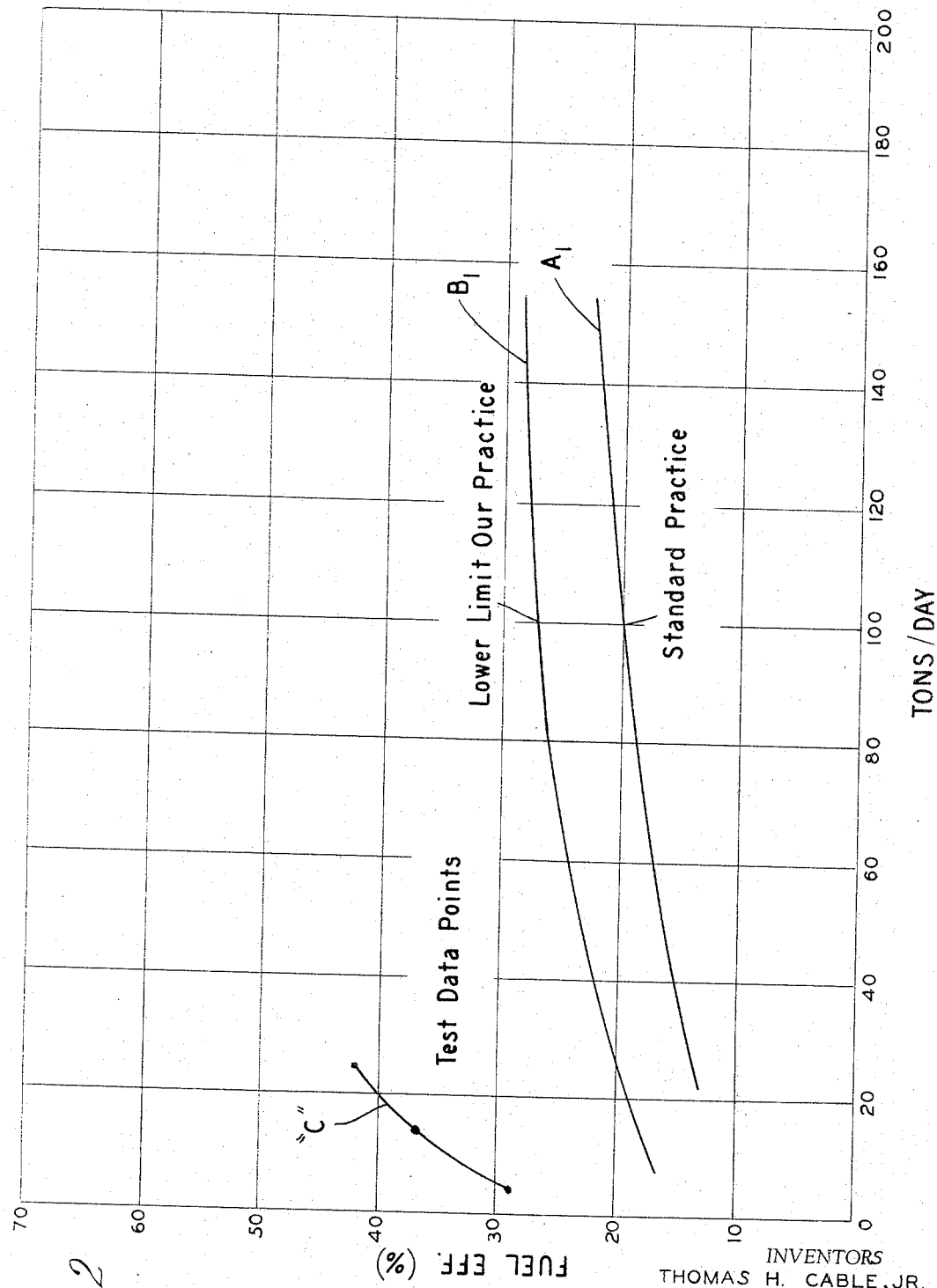
FIG. 2 is a diagram in the nature of a graph correlated to the heat input rates per square foot of melting area corresponding to a given tonnage as shown in FIG. 1, and illustrating the resulting fuel efficiency between standard practice and operation according to our invention.

Referring to FIG. 2, curve $A_1$ illustrates that furnace fuel efficiencies on the order of 15 to 23 percent are generally achieved in the glass industry. A fuel efficiency of about 20 percent for a furnace producing 100 tons per day seems to be representative of standard practice. Curve $B_1$ illustrates that when the lower limit heat input rates of curve B, shown in FIG. 1, are achieved when operating in accordance with the present invention, fuel efficiencies on the order of 20 to 29 percent can be realized. A furnace producing 100 tons per day according to the present invention could realize a fuel efficiency of about 27 percent if operated at the lower limit heat input rates. Curve C, shown in FIG. 2, is a plot of the fuel efficiencies obtained when our process was carried out on a reduced scale; the three points indicated on the curve correspond to the higher energy heat input rate points $C_1$, $C_2$, and $C_3$, shown in FIG. 1. This curve particularly illustrates the substantial increases in fuel efficiency which can be realized when rapid impingement melting with high heat input rates is employed as opposed to predominantly solution melting with relatively low heat input rates. It is noted that the slope of efficiency curve C is beginning to decrease with greater heat input rates and this tends to shown that at some higher heat input rate, the efficiency curve will tend to flatten out.

Referring now to FIGS. 3 and 4, a glassmaking furnace 10 consisting of a shell 11 having a refractory lined bottom wall 12, side walls 13 and a roof 14, has at least one high temperature heat producing device 15, such as an oxy-fuel burner, positioned in the roof 14. The furnace has a feed end 22 into which raw glass batch materials may be charged, and a discharge end 23 from which the refined glass product may be withdrawn, by means of tapping spout 21. It is to be understood that while a fuel burner 15 is shown and described, other heating devices such as an arc effluent apparatus, for example, the apparatus disclosed by Robert M. Gage in U.S. Patent No. 2,858,411, may be used. A predominant requirement of any such device, however, is that it be capable of producing a discharged product stream having a temperature of at least 3500° F. Although only one burner 15 is shown and described, more than one burner may be used, depending upon the size and shape of the furnace.

The burner 15 is positioned in the furnace structure in such manner as to enable it to fire substantially vertically downward into the feed end portion of the furnace. Such burner should preferably be fired with fuel and oxygen, however, air or oxygen-enriched air may be used. Special burner designs having a pre-heating chamber may be required to produce flame temperatures on the order of 3500° F. when using only fuel and air. When operating continuously at very high heat input rates, near the upper limits of our process, the furnace gas temperatures may rise to a point at which refractory wear becomes a problem. To overcome this we prefer, in such cases, to employ a furnace having an outer shell 36 spaced from inner shell 11 forming coolant passages 17 therebetween. Coolant passage 17 may be constructed with partitions therein so as to form circuits for coolant flow, or may be of the tank cooling type as the drawings illustrate. A coolant such as water may enter through inlet 18 and exit through outlet 19. When operating with a water cooled shell, the cooler refractory will act to condense a portion of the glass, forming a thin glass coating thereupon. The combined effect of the water coolant and this glass coating will protect the refractory from radiation damage. In this manner, the useful life of the refractories can be greatly extended. Fuel gas outlet 20 is provided in the furnace roof for exhausting the spent gases.

As shown in FIG. 4, we prefer to have the bottom 12 deeper at the center portion of the furnace than at the sides, forming a central channel. Although the cross-sectional shape formed is frustro-conical, the bottom 17 may be curved. This construction provides a deep but relatively narrow channel which allows high heat concentrations to be driven into the batch without permitting unmelted batch to float by the flame toward the furnace discharge end. Moreover, the ability to drive more heat into this narrow but deep channel can result in lower overall radiation losses and higher overall fuel efficiency.

Referring to FIG. 5, a preferred burner apparatus 15 may comprise a hopper 24 connected to a downwardly extending conduit 25, through which raw batch may be fed; a second conduit 26 of larger diameter in concentrically spaced relation to conduit 25 forms an annular passage 27 therebetween through which an oxidant may be passed; a third conduit 28 of still larger diameter in concentrically spaced relation with said second conduit forms annular passage 29 therebetween through which a fuel gas may be passed. This assembly may, if desired, be surrounded by a water jacket, wherein a continuous flow of cooling water may be maintained by means of annular water "in" passage 30 and annular water "out" passage 31. As may be seen from the drawing, the burner is designed to facilitate the easy removal of the central batch feed conduit 25, should the opening become plugged after prolonged operation. As will be explained hereinafter, the burner 15 shown in FIG. 5 is designed for use when the batch is charged into the furnace feed end directly through the burner. Alternatively, the burner 15 may be constructed as shown in FIG. 5 with the exception of having the hopper 24 and central conduit 25 removed. In such case, the apparatus would function normally as would a conventional burner.

In practicing our process raw glass batch is charged into the furnace feed end whereupon it floats upon the molten glass bath therein in the form of a batch pile B. The batch should be charged in such manner that it forms a fairly uniform layer thereupon. Burner 15 is supplied with sufficient fuel and oxidant to produce a flame having a temperature of at least 3500° F. and preferably on the order of 4500–5500 or higher. If pure oxygen were used as the oxidant, and natural gas as the fuel the 4500–5500° F. flame temperatures could be produced by operating the burner at an oxygen to fuel ratio (by volume at 70° F.) between about 1.7 and 2.5. The actual quantity of oxygen supplied to the burner will thus depend upon the amount of fuel supplied. The amount of fuel supplied in turn will vary, as a function of the tonnage of glass produced, the effective heat input to the glass, and overall efficiency of the process.

As an illustration of the approximate fuel, oxidant and furnace size requirements when operating at the lower limit of our process, suppose it is desired to produce 30 tons of glass per day from a charge of batch containing no cullet. The heat required per hour to melt the charge will be $$\frac{(30 \text{ tons/day}) (2,000,000 \text{ B.t.u./ton})}{24 \text{ hours/day}}$$

or 2,500,000 B.t.u./hour. From FIG. 1, curve B, the lower heat input rate with our process for an output of 30 tons per day is about 25,000 B.t.u./hour per square foot of melting area. The total furnace melting area required will thus be $$\frac{2,500,000 \text{ B.t.u./hr.}}{25,000 \text{ B.t.u./hr./sq. ft.}}$$

or 100 square feet. From FIG. 2, curve $B_1$, the approximate overall efficiency at the lower limit for a daily output of 30 tons is on the order of 20 percent. Assuming natural gas is the fuel, which when combusted will produce about 1,000 B.t.u./s.c.f., the estimated fuel consumption will be about $$\frac{2,500,000 \text{ B.t.u./hr.}}{(1,000 \text{ B.t.u./s.c.f.}) (.20)}$$

or 12,500 s.c.f./hr. If the natural gas is burned in nearly stoichiometric proportions with oxygen, it would require an oxy-gas ratio on the order of 2 to 1. This would produce a flame having a temperature of about 4800° F. The oxygen required would thus be about 12,500×2 or 25,000 s.c.f./hr.

When operating at higher effective heat inputs than the minimum as shown by curve B, FIG. 1, the procedure to follow in determining the fuel, oxidant and melting area requirements is substantially as outlined above. The determination of fuel and oxidant requirements in such cases, however, may have to be roughly estimated by choosing an estimated efficiency greater than the minimum shown by curve $B_1$ in FIG. 2 and less than an extrapolated curve C of FIG. 2. This would be sufficient to determine the size and number of burners required. The actual fuel and oxidant rates could then be determined more accurately by actual furnace operation to produce the desired tonnage.

When using an arc effluent, for example, as taught by Gage in U.S. Patent No. 2,858,411, it is of course, possible to obtain product gas stream temperatures from the apparatus which are substantially higher than 5500° F. In either case, however, such high temperature flame or effluent is directed from the burner 15 or arc effluent device to impinge upon the charged floating batch so that such bath is rapidly melted while it is in the feed end of the furnace. By impinging the flame or effluent against the batch very high temperature differentials between the batch and flame or effluent are produced without necessarily overheating the furnace. The molten batch is flowed to the furnace discharge end whereupon the entrapped gases are removed. Since the rate of bubble evolution is highest when the glass bath is at low viscosity, the temperature of the bath in the discharge end should be controlled to maintain a bath temperature therein between about 2600 and 3100° F. The burner 16, shown positioned over the furnace discharge end serves as an auxiliary heating device to maintain the glass temperature in such range. Such burner may be fired with fuel and air, and may be of conventional design. After the molten glass has been refined to a suitable level it is removed from the discharge end through topping spout 21. At the same time, fresh batch is being charged to the furnace feed end at approximately the same rate at which the refined glass is being removed, so that the process is more or less continuous. The critical element controlling the rate of production in our process is the speed in which the charged batch is completely melted by the impingement thereupon of the flames or arc effluent. Thus the production rate must be subservient to the complete melting of the charged batch in the furnace feed end. Unmelted batch should not be permitted to flow to the discharge end as this usually causes imperfections in the finished glass product.

As an alternative method of charging the raw batch into the furnace we prefer to charge the batch directly through the burner. In such case, an apparatus as shown in the FIG. 5, may be employed. When the batch is fed through the burner it can be heated and raised to a molten condition as it is flowing into the furnace. The raw batch may either be gravity fed into the hopper 24 atop burner 15, or may be conveyed to the central conduit 25 under pressure as schematically shown in the drawings. If the latter method is used, it would be preferable to use a high pressure oxygen stream as the batch carrier gas.

Although the burner 15 may be positioned in the walls of the furnace such that it fires substantially vertically downward to impinge upon the batch in the feed end of the furnace, the preferred location of the burner is in the furnace roof. As previously mentioned, the term "substantially vertically downward" is defined as a direction having an angle between zero and 45 degrees with respect to the vertical axis of the furnace. We prefer to operate within this range, and closer to the vertical position, since the rate of heat transfer, and therefore fuel efficiency, falls off sharply when the burner is operated at greater angles from the vertical axis. Another advantage gained by directing the high temperature flame or effluent substantially vertically downward to impinge upon the batch in the feed end is a reduction in direct radiation to the surrounding refractories.

*Test results*

For testing purposes, a small checkerless furnace with a melting area of 8.2 square feet, and similar in many respects to the furnace shown in FIGS. 3 and 4 but with a conventional bottom, was constructed and operated continuously for a 48-hour period. A larger pilot furnace, having a melting area of 14 square feet, was also tested (Model Furnace No. 2) at a later date. A comparison of average operating conditions and results between a conventional production furnace, operated in accordance with standard practice, and the reduced scale test furnaces, operated in accordance with our invention, is shown below: in both tests, the resultant refined glass product leaving the furnace was found to be remarkably high in structural, clarity and color qualities.

TABLE 1

| | Present Practice | Model Test Furnaces | |
|---|---|---|---|
| | | Test #1 | Test #2 |
| Melting area per daily ton, sq. ft. | 4.5 | 1.5 | 0.52 |
| Tons per day, average | 150 | 5.4 | 25 |
| Tons per Day per sq. ft. area | 0.22 | 0.67 | 1.92 |
| Natural gas, CF/ton | 8,900 | 6,800 | 4,800 |
| Air, CF/ton | 975,000 | 0 | 0 |
| Oxygen added, CF/ton | 0 | 11,500 | 9,100 |
| Fuel efficiency percent (basis 2.0 m.B.t.u./ton) theoretical | 22.5 | 29.3 | 41.7 |
| Tap stream temperature, °F | 2,670 | 2,850 | 2,850 |
| Softening point of glass, °C | 712 | 709 | 709 |

By operating a furnace in accordance with our invention, it was possible to produce a high-quality glass with a minimum sized furnace. These results indicate that substantial increases in both furnace output and fuel efficiency are possible on a large tonnage commercial basis when the teachings of our invention are utilized.

Physical analysis of the glass produced showed a softening point which averaged 3 deg. C. lower than normal production glass. It should be explained here that fluxes are usually added to the feed materials in order to make the glass "soft" or workable, since physical characteristics play an important part in the molding of the product. These fluxes are expensive, and a fusion loss of 15 percent due to their volatilization is not uncommon. This volatilization loss is detrimental not only because of the waste of materials, which are usually the more expensive ingredients in the batch, but also because the amount of loss is hard to calculate and varies with different portions of the same charge of the same batch, because of the differences in size and composition of different portions of the charge. The lower softening point achieved in our process indicates less of a flux volatilization than would occur in normal practice and hence a need for less initial flux addition. This points up a further cost savings per ton of glass produced.

The invention herein has been described broadly in terms of the production of materials falling under the designation "glass," and it is to be understood that this includes all types of glasses and glass-like materials.

What is claimed is:

1. A process for the production of refined glass from raw glassmaking materials in a glassmaking furnace having a feed end zone and a discharge end zone, which process comprises charging raw glassmaking materials into the feed end zone, directing at and impinging upon the exposed exterior surface portion of the raw glassmaking materials at least one heated effluent having a minimum temperature of 3500° F. and a sufficient heat content so as to produce a peeling type melting of said raw materials and transfer thereto between 25,000 and 415,000 B.t.u/hour per square foot of furnace area whereby said materials will be completely melted and refined; and withdrawing the refined glass from the discharge end zone while charging raw glassmaking materials into the feed end zone at rates sufficient to produce and maintain the glass being withdrawn from the discharge end zone at a temperature of at least 2600° F.

2. A process for the continuous production of refined glass from raw glass batch materials in a glassmaking furnace having a feed end zone, a discharge end zone, and a refining zone intermediate the feed end zone and discharge end zone which process comprises charging raw glass batch materials into the feed end zone so as to form a batch pile at said feed end, directing at and impinging upon the exposed exterior surface portion of said batch pile at least one heated gaseous effluent having a minimum temperature of 3500° F. and a sufficient heat content so as to produce a peeling type melting of said raw glass batch materials in the feed end zone and transfer thereto between 25,000 and 415,000 B.t.u./hour per square foot of furnace melting area; flowing the melted glass through the refining zone and refining it therein at a maintained glass temperature of at least 2600° F., and withdrawing the refined glass from the discharge end zone while charging raw glass batch materials into the feed end zone at sufficient rates to maintain the temperature of the glass being withdrawn from the discharge end zone between 2600° F. and 3100° F.

3. A process for the continuous production of refined glass from raw glass batch materials in a glassmaking furnace having a feed end zone, a discharge end zone, and a refining zone intermediate the feed end zone and discharge end zone which process comprises charging raw glass batch materials into the feed end zone so as to form a batch pile therein, directing at and impinging upon the exposed exterior surface of said batch pile at least one heated gaseous effluent formed by the combustion of sufficient quantities of fuel and oxidant to produce a peeling type complete melting of said raw glass batch materials in the feed end zone and transfer thereto between 25,000 and 415,000 B.t.u./hour per square foot of furance melting area; flowing the melted glass through the refining zone and refining it therein at a glass temperature of at least 2600° F., and withdrawing the refined glass from the discharge end zone while charging raw glass batch materials into the feed end zone at sufficient rates to maintain the temperature of the glass being withdrawn from the discharge end zone between 2600° F. and 3100° F.

4. A process according to claim 3 wherein the oxidant comprises oxygen enriched air.

5. A process for the continuous production of refined glass from raw glass batch materials in a glassmaking furnace having a feed end zone, a discharge end zone and a refining zone intermediate the feed end zone and the discharge end zone which process comprises charging raw glass batch materials into the feed end zone so as to form a batch pile therein, directing at and impinging upon the exposed exterior surface portion of said batch pile at least one high temperature flame having a temperature of at least 3500° F. and formed by the combustion of sufficient quantities of fuel and oxidant to produce a peeling type complete melting of said raw glass batch materials in the feed end zone and transfer thereto between 25,000 and 415,000 B.t.u./hour per square foot of furnace melting area; flowing the melted glass through the refining zone and refining it therein at a minimum glass temperature of 2600° F., and withdrawing the refined glass from the discharge end zone while charging raw glass batch materials into the feed end zone at sufficient rates to maintain the temperature of the withdrawn glass between 2600° F. and 3100° F.

6. A process for the continuous production of refined glass from raw glass batch material which comprises providing a glassmaking furnace having at least one fuel fired burner positioned to fire into the furnace feed end, charging raw glass batch materials into the furnace feed end; supplying sufficient fuel and oxidant to said burner to produce a flame having a temperature of at least 3500° F. and a heat content sufficient to transfer between 25,000 and 415,000 B.t.u./hour per square foot of melting area to the glass materials, directing said flame to impinge upon the exposed exterior surface portion of the batch in such a manner as to produce a peeling type melting of the batch and to substantially completely melt the batch rapidly in said feed end by the action of said flames and transfer thereto between 25,000 and 415,000 B.t.u./hour per square foot of furnace melting area, flowing the melted glass toward the furnace discharge end and refining it at a molten glass temperature of at least 2600° F., and withdrawing the refined glass from the furnace discharge end while charging raw glass batch material to the furnace feed end at sufficient rates to control the temperature of the glass being withdrawn within the range of 2600° F. to 3100° F.

7. A process for the continuous production of refined glass from raw batch glassmaking materials which comprises providing a glassmaking furnace having a plurality of fuel fired burners positioned to fire into the feed end of the furnace; continuously charging raw batch glassmaking materials into the furnace feed end; supplying sufficient fuel and oxidant to said burners to produce flames having a temperature of at least 3500° F. and a total heat content sufficient to transfer between 25,000 and 415,000 B.t.u./hour per square foot of furnace melting area to the glass batch materials, directing said flames substantially vertically downward to impinge upon the exposed exterior surface of the batch to produce a peeling type melting of said batch and completely melt said batch in said feed end and transfer thereto between 25,000 and 415,000 B.t.u./hour per square foot of furnace melting area, flowing the melted glass toward the furnace discharge end and refining it at a molten glass temperature of at least 2600° F. and withdrawing the refined glass from the furnace discharge end at approximately the same rate at which the raw glass batch materials are charged, while controlling such rate to maintain the temperature of the withdrawn glass between 2600° F. and 3100° F.

8. A process for the continuous production of refined glass from raw batch glassmaking materials which comprises providing a glassmaking furnace having at least one fuel fired burner positioned to fire into the feed end of the furnace, supplying sufficient fuel and oxidant to said burner to produce a flame having a temperature of at least 3500° F. and a sufficient heat content to transfer between 25,000 and 415,000 B.t.u./hour per square foot of furnace melting area to a charged glass batch, charging a continuous stream of raw batch to said burner, discharging said stream from said burner within the flame produced thereby to form a partially molten stream of glass batch entering the furnace feed end, directing said flame to impinge upon the exposed exterior surface portion of the partially molten batch to produce a peeling type melting thereof and to completely melt it in said feed end and transfer thereto between 25,000 and 415,000 B.t.u./hr. per square foot of furnace melting area; flowing the melted glass toward the furnace discharge end and refining it at a molten glass temperature of at least 2600° F., and withdrawing the refined glass from the furnace discharge end at approximately the same rate at which said raw batch is charged, while controlling such rate to maintain the temperature of the withdrawn glass between 2600° F. and 3100° F.

References Cited

UNITED STATES PATENTS

| | | | |
|---|---|---|---|
| 1,575,514 | 3/1926 | Shively | 65—335 |
| 1,750,966 | 3/1930 | Rule | 65—326 |
| 1,834,631 | 12/1931 | Mulholland | 65—335 |
| 2,262,070 | 11/1941 | Turk | 65—160 |
| 3,077,094 | 2/1963 | Jack et al. | 65—136 |
| 3,249,417 | 5/1966 | Van Zonneveld | 65—134 |
| 3,260,587 | 7/1966 | Dolf et al. | 65—135 |
| 3,266,879 | 8/1966 | Krøyer | 65—33 |

DONALL H. SYLVESTER, *Primary Examiner.*

S. LEON BASHORE, *Examiner.*

D. CRUPAIN, G. R. MYERS, *Assistant Examiners.*